United States Patent

Wadding

[15] 3,689,704

[45] Sept. 5, 1972

[54] CONSTANT CURRENT OUTPUT CONTROLLED REPEATER INSERTION

[72] Inventor: Richard E. Wadding, Milan, Tenn.

[73] Assignee: International Telephone and Telegraph Corporation, New York, N.Y.

[22] Filed: Dec. 17, 1969

[21] Appl. No.: 885,672

[52] U.S. Cl. ........................................ 179/16 F
[51] Int. Cl. ........................................ Ho4q 1/28
[58] Field of Search.....179/16 F, 84 VF, 16 E, 1 CN, 179/170 R, 16 EA, 18 BC

[56] References Cited

UNITED STATES PATENTS

| | | | |
|---|---|---|---|
| 3,424,858 | 1/1969 | Pfyffer et al. | 179/170 R |
| 3,083,265 | 3/1963 | Paulaitis et al. | 179/170 R |
| 3,035,122 | 5/1962 | Livingstone | 179/16 F |
| 2,398,854 | 4/1946 | Ray | 179/16 F |

OTHER PUBLICATIONS

Telephony; Ray Blain, " Constant Current Operation (CCO) . . . New Switching, Transmission Tool," April 1968, pgs. 38-40.

*Primary Examiner*—Kathleen H. Claffy
*Assistant Examiner*—Randall P. Myers
*Attorney*—C. Cornell Remsen, Jr., Walter J. Baum, Percy P. Lantzy, J. Warren Whitesel, Delbert P. Warner and James B. Raden

[57] ABSTRACT

Individual voice frequency repeaters may be associated with any telephone connection, as required. More particularly, the lines involved in the connection are supplied by a constant current output (CCO) device. When the output of the CCO device reaches the level of voltage which indicates the line requires a given signal level gain, a switching access network operates to connect a repeater in the pool to the particular line requiring that level gain. If the required level is reached on both the calling and called line, the repeater output is increased.

4 Claims, 3 Drawing Figures

INVENTOR
RICHARD EUGENE WADDING
BY
ATTORNEY

CONSTANT CURRENT OUTPUT CONTROLLED REPEATER INSERTION

This invention relates to line current adapters and more particularly to adapters controlled by constant current output devices (sometimes called "CCO's"), and especially—although not exclusively—to use of such adapters on long lines.

Usually telephone systems are designed around some nominal line impedance, and all appropriate equipment in the system is designed to operate at this nominal impedance. Unfortunately, however, all lines do not exhibit this nominal impedance. Therefore, the equipment connected to the line cannot be expected to work well unless it is designed to have such wide parameters that there is a gross inefficiency in component utilization.

A number of different plans are used to compensate for the variation of line impedance and to enable the usage of smaller gauge wire. Among other things, it is commonplace to attach a line current adapter to each pertinent line circuit and to individually adjust the gain of an amplifier in the adapter to compensate for any variation in line impedance which may exist on the associated line. This is expensive because an adapter is required for every non-standard line, and generally a human must adjust each adapter. Another approach is to put a line current adapter in a connector having access to groups of the lines with non-standard impedance. The problem here is that if a person moves to a new location served by a line of standard impedance, his telephone number must be changed. Still another approach is to use a constant current output device in series with windings of the battery feed relay which is connected to supply power to the line.

Battery feed relays are commonly used and are known by many different names such as: calling bridge, answer bridge, front bridge, back bridge line, line feed, etc. relay. They usually have two windings, one winding connected between the tip conductor and a positive battery terminal and the other winding being connected between the ring conductor and a negative battery terminal. The relay is operated when a loop is closed by hookswitch contacts at the telephone set and released when the loop is opened. The current through the relay supplies the energy required to power the subscriber telephone set. Contacts on the relay hold the switch train during conversation and releases the switch train when the conversing parties hang up.

The constant current output device (CCO) is generally inserted in series between one winding of the battery feed relay and a booster battery having an energy reserve sufficient to maintain the constant current level under all foreseeable line conditions. The resulting control over power utilization at the subscriber station enables the line to be extended in length and the impedance to vary over a wide range. However, there is a limit to what can be done merely by maintaining a constant current on the line. Since the speech signal content of line current is not preferred over the noise on the line, there is an adverse signal-to-noise ratio at the margin of operations. Hence, there is a limit beyond what a further increase in power to the line merely acts equally upon signal and noise. After the signal to noise ratio cannot be allowed to further deteriorate, the CCO device has reached its limit.

To add a still further extended range to the system operations, a suggestion has been made that voice frequency repeaters should be added to the systems. These repeaters amplify the speech signals to restore an acceptable signal-to-noise ratio so that CCO devices may further increase power without deterioration of the service. However, this requires a dedication of repeater to groups of lines and returns to the problems of dedicated line current adapters thereby sacrificing the low cost and flexibility gained by the CCO devices.

Accordingly, an object of this invention is to provide new and improved means for adapting a system to work with extremely long lines. In particular, an object is to preserve an attractive signal-to-noise ratio on extremely high impedance loops, without sacrificing the flexibility to be gained from use of CCO devices. Here an object is to extend the useful range of CCO devices.

Another object is to provide a more flexible means of handling longer line loops than have heretofore been available even with the use of CCO devices, per se.

Yet another object is to enable a use of lines having a greater variation of line impedances in one group.

Still another object is to provide both CCO devices and voice frequency repeaters for some lines without requiring a change in telephone numbers when a subscriber moves from a line requiring a CCO device and a repeater to a line not requiring a CCO device and a repeater or a line not requiring a CCO device. Here, an object is to selectively control a voice frequency repeater to provide a variable output depending upon whether either one or both of the calling and called lines is a high impedance line.

According to one aspect of this invention, these and other objects are accomplished by providing a pool of voice frequency repeaters and a switching network for individually associating a repeater with any telephone connection, as required. The lines involved in the connection are supplied by a CCO device. When the CCO device internal resistance reaches a level which indicates the line requires a given amount of signal gain, the switching access network operates to connect a repeater to the line requiring the signal gain. If the required level is reached on both the calling and called line, the repeater output is increased.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
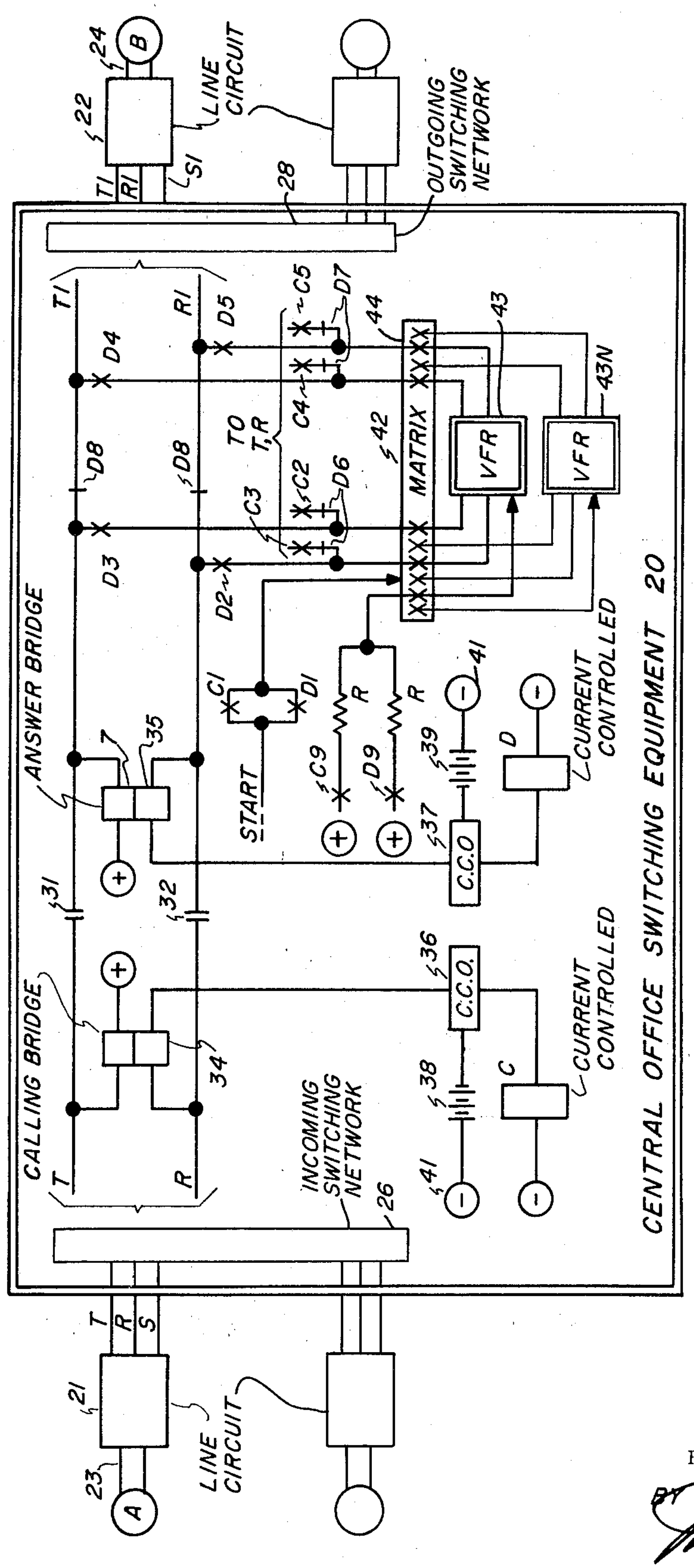
FIG. 1 is in part, a block diagram of a telephone system, and in part, a schematic diagram of an embodiment of the inventive CCO control circuit.

Broadly, FIG. 1 shows a telephone system including a plurality of calling and called stations, one of each being designated Station A and B, interconnected by any suitable central office switching equipment 20. Each station is connected to the central office via its line circuit 21, 22 and a pair of wires, 23, 24. If the wires 23 or 24 or both are of very high resistance, it is necessary to boost the power to station A or B, or both. Of course, there is no need to do anything special if the lines 23, 24 have an acceptable resistance for normal operation.

Each line circuit 21, 22 is connected to the central office equipment via the usual tip, ring, and sleeve conductors T, R, S. Inside the office, any suitable equipment such as switching networks 26 and 28 responds in any suitable manner to interconnect the calling and called line. Generally, the connection is made responsive to either dial pulses or pushbutton sent tones. Regardless of the system that is used, some form of battery feed must be provided, usually at a point of maximum traffic concentration since the least number of system elements are required at that point. For example, in step-by-step exchanges, the battery feed is provided in a connector.

FIG. 1 shows the pertinent parts of a battery feed circuit. More particularly, a pair of wires T and R are separated into two D.C. circuits by capacitors 31, 32, to provide an A.C. path for speech signals between calling and called stations while establishing D.C. isolation between either end. A pair of double wound battery feed relays 34, 35, are connected to the tip and ring leads on either side of the capacitors 31, 32. The central office common battery is connected to the lines via the windings of these relays. Positive or ground potential is applied to the tip side T via the upper windings of relays 34, 35. Negative or battery potential is applied to the ring side R via the lower windings of these relays.

The power circuit may be traced from the central office battery over a path extending through the windings of relay 34, tip and ring conductors T, R, and line 23 to the calling station A. As long as the station A is off-hook, a loop is completed across the line 23, and relay 34 remains operated. When the calling subscriber hangs up, the loop is broken, and relay 34 releases. The calling switch train is held operated via contacts (not shown) on relay 34, as long as the loop is completed. When the loop is broken, relay 34 releases, and these contacts open to release the switch train. A similar circuit and function is completed to called station B via the windings on relay 35, conductors T1, R1, and line 24.

According to the constant current mode of operation, a pair of constant current (CCO) devices 36, 37, are connected in series with booster batteries 38, 39, and the series circuit is, in turn, connected between the (−) or battery terminal 41 of the central office battery and a winding on the relay 34 or 35, as the case may be. The booster battery 38 or 39 supplies enough energy to enable the CCO device 36 or 37 to maintain current on the line at some predetermined value, such as 35 milliamperes. As the line impedance or resistance goes up, the voltage out of the CCO devices 36, 37, increases to exactly compensate for the added demand, thereby maintaining a stable and unvarying current on the line.

Constant current devices of this type are well known, having been shown in U.S. Pat. No. 2,716,729 (with respect to electromechanical systems) and at 66 in U.S. Pat. No. 3,343,003 (with respect to electronic systems). Similar CCO devices are also being offered for sale in the present commercial market by the Cook Electric Company of Chicago, and the Tri-State Communication Service, Inc. of Amarillo, Texas. Articles describing these CCO devices have been published by the REA (an agency of the U.S. Government) and by the Telephony magazine, pages 33, and 40, of April 6, 1968 edition.

According to the invention, current sensitive or bridge controlled relays C, D, are attached to the CCO devices 36, 37 respectively. As the resistance or impedance of the line increases, each CCO device decreases in internal resistance to keep the line current constant; the resulting decrease in internal resistance of the CCO device causes the voltage across the coil to increase or a bridge to unbalance operating the relays C or D, or both, depending upon whether lines 23 or 24, or both, are calling for more voltage. Relays C or D may be operated by an increase in voltage across the coil causing the current to reach the operating point of the relay. This is reached when the bridge is unbalanced to a predetermined degree. Alternatively any suitable voltage device may be used.

Assume first that the called line 24 has a very high resistance. The CCO device decreases in internal resistance to supply higher amounts of voltage to the line. When the line resistance exceeds some value, such as 3,200 ohms, the internal resistance of the CCO device 37 reaches a level which is low enough to operate relay D.

Responsive to the operation of relay D, contacts D1 close to start a switching matrix 42. This matrix may have any known form, such as: a stepping switch, a crossbar switch, a relay connector, a crosspoint matrix (glass reed or electronic), or the like. In any event, the matrix 42 connects the tip and ring leads T1, R1 of the switching device or trunk circuit associated with contacts D1 to an idle one, 43, of many voice frequency repeaters 43, 43N etc. Any suitable repeater may be used, such as KE–6 repeater sold by the International Telephone and Telegraph Corporation, Raleigh, N. C. The crosspoints which close to make these connections are generically indicated by X marks, as at 44. The make contacts D2–D5 close to connect the voice frequency repeater 43 to the speech conductors T1, R1. The break contacts D6, D7 open to prevent any connection between repeater 43 and the conductors T and R. The contacts D8 open to break the conductors T1, R1 and force the line currents through repeater 43. The contacts D9 close to supply a predetermined bias potential through the fixed resistor R to the voice frequency repeater 43. There is now a fixed amplification, such as a 7 db gain of the voice signals on the line T1, R1.

Assume next that the line 23 has a very high resistance, and relay C operates. Contacts C1 close to start the switching matrix 42, which operates to select an idle repeater 43. Contacts C2–C5 operate to connect the voice frequency repeater 43 to the speech conductors T, R. Contacts D2–D5 are standing open because relay D is not operated. Therefore, the voice signal cannot reach conductors T1, R1. The contacts C9 close to forward a bias signal to the repeater 43 via a fixed resistance R. Again, the repeater 43 adds a fixed amplification (such as 7 db) to the signal on the line T, R.

Finally, assume that both of the lines 23, 24 are very high resistance, and both of the relays C and D operate.

Contacts C1, D1 are in parallel; thus, an operation of either or both have the same effect—matrix 42 connects an idle repeater 43 to the line. Contacts D2–D5 operate to insert the repeater 43 in the line at conductors T1, R1. Contacts D6, D7 open to prevent repeater insertion in the line at the conductors T, R. Both of the contacts D9, C9 close. Therefore, the bias potential is supplied to repeater 43 through the two fixed resistors R, connected in parallel. Essentially, this doubles the bias voltage and the amplification of the voice frequency repeater 43. Thus, the repeater 43 puts out 14 db amplification when both lines 23, 24 are very long and have high resistance.

Figure 2:
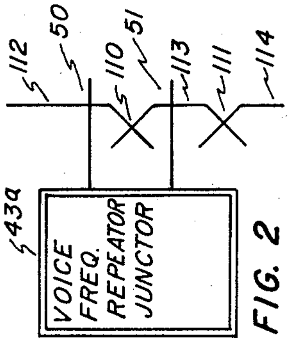
FIG. 2 shows an embodiment of the invention applied to a specific type of switching system.

FIG. 2 shows how the equipment of FIG. 1 may be used in a particular switching system. In greater detail, U.S. Pat. No. 3,441,277 (E. L. Erwin, et al.) shows the "Pentaconta A–1" crossbar switching system manufactured and sold by the International Telephone and Telegraph Corporation, Milan, Tennessee. In FIG. 1 of that patent, a crossbar switch is shown as having split verticals, one of which is designated by the reference characters 112, 113, and 114. The verticals are physically cut at 110 and 111 to form electrically isolated sections of crosspoints. The same reference characters are used in FIG. 2 to designate the same parts.

Essentially, line circuits (such as 21, 22) are connected to a first segment 112 of each split vertical, and various kinds of trunk circuits are connected to a second segment 113 of each split vertical. The third segment 114 includes junctors used for making intervertical linkage. To interconnect two or more pieces of equipment in the "Pentaconta A–1" system, it is only necessary to operate a given number of crosspoints on a single given vertical. Hence, it is possible to make a single vertical call by connecting a line connected to segment 112 to a trunk connected to segment 113.

In this system, the CCO equipment shown in FIG. 1 can be connected to a line by simply operating two extra crosspoints 50, 51, in addition to the other crosspoints which are operated to make a normal connection. This one vertical connection capability simplifies the circuit by eliminating the switching matrix 42, and a number of relay contacts, such as D2–D7 and C2–C5.

With the two embodiments shown in FIGS. 1 and 2, it is thought that those who are skilled in the art will readily perceive how to connect the inventive circuit into any switching system.

Figure 3:
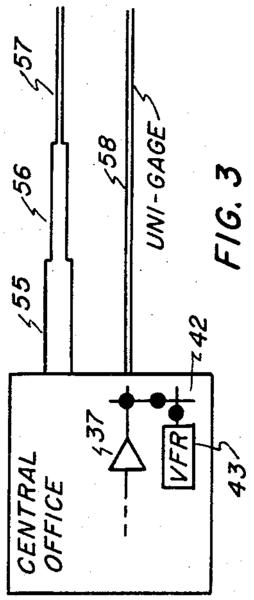
FIG. 3 shows how a central office may use the invention to enable a uni-gauge installation in a multi-gauge office.

An advantage of the invention is illustrated by FIG. 3. Many central offices have been installed with subscriber lines of different gauge wire running out to a subscriber station. As the subscriber lines extend outwardly for a first predetermined distance from the central office, the wire 55 is of large diameter to carry a relatively heavy current. After the current has been attenuated over a certain distance, the gauge of the wire 56 is reduced to carry the remaining current at no loss. Still further out from the central office, a similar reduction in wire gauge occurs at 57. As better equipment has become available, it is no longer necessary to provide this more expensive multi-gauge subscriber line installation. Instead, a single, uni-gauge wire may be run out even greater distances to subscriber stations. Electronic amplifiers or repeaters may make up the differences in current carrying capabilities, as required. However, there are some complicated problems in central offices having subscriber lines which mix multi-gauge and uni-gauge wires. For example, it is not possible to predict when a multi-gauge line is to be connected to another multi-gauge line or to a uni-gauge line, or when two uni-gauge lines are to be interconnected. Hence, it has been necessary either to have complex controls in the central office, or to provide long line adapters uniquely dedicated to the uni-gauge wires, or to use some other equally awkward solution. Now, the invention enables the system to automatically provide a proper current supply to any combination of multi-gauge or uni-gauge wiring with virtually no additional equipment or unsolved problems.

The use of contacts C9, D9 enable two steps of amplification to provide for two different current level requirements. An extension of the principle could provide for any convenient number of steps of amplification. For example, extra long subscriber lines could require additional degrees of amplification.

While the principles of the invention have been described above in connection with specific apparatus and applications, it is to be understood that this description is made only by way of example and not as a limitation on the scope of the invention.

We claim:

1. A telephone system comprising calling and called stations interconnected by switching equipment, means for energizing said stations from constant current sources within said equipment, one of said sources being connected to energize said called station, a plurality of voice repeaters associated with said switching equipment and control means in said switching equipment responsive to a high current demand condition at either of said constant current sources for selectively connecting an idle one of said voice repeaters to said interconnected stations.

2. The system of claim 1, wherein said control means is responsive to a high current demand condition at both of said sources for increasing the amplitude of the output of said connected voice repeater.

3. The system of claim 1, wherein there is associated with each of said sources a series circuit including a first pole of a battery, a booster battery, a constant current output device, and a winding on a battery feed relay; said winding being disposed across the conductors of the connected station for connection to the opposite pole of said battery.

4. The system of claim 1 wherein a plurality of subscriber station lines extend outwardly from a central office which includes the switching equipment, said lines having different current carrying characteristics, and means comprising the constant current source connected to the station of each line for maintaining predetermined current to said line regardless of the characteristics of the line, and wherein some of said lines are multi-gauge lines and other of said lines are uni-gauge lines.

* * * * *